United States Patent
Jansen et al.

(10) Patent No.: US 11,335,328 B2
(45) Date of Patent: May 17, 2022

(54) UNSUPERVISED LEARNING OF SEMANTIC AUDIO REPRESENTATIONS

(71) Applicant: Google LLC, Mountain View, CA (US)

(72) Inventors: Aren Jansen, Mountain View, CA (US); Manoj Plakal, Mountain View, CA (US); Richard Channing Moore, Mountain View, CA (US); Shawn Hershey, Mountain View, CA (US); Ratheet Pandya, Mountain View, CA (US); Ryan Rifkin, Mountain View, CA (US); Jiayang Liu, Mountain View, CA (US); Daniel Ellis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/758,564

(22) PCT Filed: Oct. 26, 2018

(86) PCT No.: PCT/US2018/057734
§ 371 (c)(1),
(2) Date: Apr. 23, 2020

(87) PCT Pub. No.: WO2019/084419
PCT Pub. Date: May 2, 2019

(65) Prior Publication Data
US 2020/0349921 A1 Nov. 5, 2020

Related U.S. Application Data

(60) Provisional application No. 62/577,908, filed on Oct. 27, 2017.

(51) Int. Cl.
*G10L 15/06* (2013.01)
*G10L 15/16* (2006.01)
(Continued)

(52) U.S. Cl.
CPC .............. *G10L 15/063* (2013.01); *G06N 3/04* (2013.01); *G06N 3/08* (2013.01); *G10L 15/02* (2013.01);
(Continued)

(58) Field of Classification Search
CPC ......... G10L 15/02; G10L 15/06; G10L 15/16; G10L 25/30
See application file for complete search history.

(56) References Cited

U.S. PATENT DOCUMENTS

2010/0257129 A1* 10/2010 Lyon ....................... G10L 25/48
706/12
2017/0228641 A1* 8/2017 Sohn .................... G06N 3/0454
(Continued)

FOREIGN PATENT DOCUMENTS

| | | |
|---|---|---|
| GN | 107221320 | 9/2017 |
| WO | WO2017/168125 | 10/2017 |

OTHER PUBLICATIONS

International Search Report for International Application No. PCT/US2018/057734 dated Apr. 3, 2019, 4 pages.

*Primary Examiner* — Shreyans A Patel
(74) *Attorney, Agent, or Firm* — McDonnell Boehnen Hulbert & Berghoff LLP (57) ABSTRACT

Methods are provided for generating training triplets that can be used to train multidimensional embeddings to represent the semantic content of non-speech sounds present in a corpus of audio recordings. These training triplets can be used with a triplet loss function to train the multidimensional embeddings such that the embeddings can be used to cluster the contents of a corpus of audio recordings, to facilitate a query-by-example lookup from the corpus, to allow a small number of manually-labeled audio recordings to be generalized, or to facilitate some other audio classification task. The triplet sampling methods may be used individually or
(Continued)

collectively, and each represent a respective heuristic about the semantic structure of audio recordings.

20 Claims, 5 Drawing Sheets (51) Int. Cl.
*G10L 15/02* (2006.01)
*G10L 25/30* (2013.01)
*G06N 3/04* (2006.01)
*G06N 3/08* (2006.01)
*G10L 25/18* (2013.01)
*G10L 25/51* (2013.01)

(52) U.S. Cl.
CPC .............. *G10L 25/18* (2013.01); *G10L 25/51* (2013.01); *G10L 25/30* (2013.01); *G10L 2015/0635* (2013.01)

(56) References Cited

U.S. PATENT DOCUMENTS

2018/0018451 A1* 1/2018 Spizhevoy .......... G06K 9/00617
2018/0336888 A1* 11/2018 Jiang .................... G06N 3/0445
2020/0320769 A1* 10/2020 Chen .................... G06K 9/6256

* cited by examiner

UNSUPERVISED LEARNING OF SEMANTIC AUDIO REPRESENTATIONS

CROSS-REFERENCE TO RELATED APPLICATION

This application is a national stage application under 35 U.S.C. § 371 of International Application No. PCT/2018/057734, filed Oct. 26, 2018, which claims priority to U.S. Provisional Patent Application No. 62/577,908, filed Oct. 27, 2017, which is incorporated herein by reference.

BACKGROUND

Artificial neural networks can be trained to identify and/or classify the contents of audio recordings. Such classifications can be used to determine a semantic content or context for the recording, to determine a location of the recording, to identify a purpose of the recording, to generate content tags for the recording, to select one or more audio processing steps for the recording, or to provide some other benefit. The contents of the audio recordings may include speech or other sounds. In order to train such a classifier, manually-generated labels may be provided with the audio recordings. However, such manual labels may be expensive to generate. Additionally, such manual labels may require an exclusive set of possible labels for the audio contents to be generated before the manual labelling process begins; such an exclusive set may lack labels for all of the sound contents of the audio recordings.

SUMMARY

An aspect of the present disclosure relates to a method including: (i) obtaining training data that includes a plurality of sound recordings; (ii) generating a plurality of training triplets, wherein each training triplet of the plurality of training triplets includes a respective anchor audio segment, a positive audio segment, and a negative audio segment from the plurality of sound recordings, wherein generating the plurality of training triplets comprises performing one of a first triplet sampling operation, a second triplet sampling operation, a third triplet sampling operation, or a fourth triplet sampling operation; (iii) mapping each audio segment of each training triplet of the plurality of training triplets to a respective feature vector in an n-dimensional feature space; and (iv) updating the mapping based on the determined feature vectors such that a loss function is reduced. The loss function includes a sum of a plurality of terms, wherein each term in the plurality of terms corresponds to a respective training triplet in the plurality of training triplets. A term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet. Performing the first triplet sampling operation includes: selecting, for a first training triplet of the plurality of training triplets, an anchor audio segment from the plurality of sound recordings; determining a positive audio segment for the first training triplet by adding noise to the anchor audio segment of the first training triplet; and determining a negative audio segment for the first training triplet by selecting, from the plurality of sound recordings, an audio segment that differs from the anchor audio segment of the first training triplet. Performing the second triplet sampling operation includes: selecting, for a second training triplet of the plurality of training triplets, an anchor audio segment from the plurality of sound recordings; determining a positive audio segment for the second training triplet by applying a frequency shift or a time shift to the anchor audio segment for the second training triplet; and determining a negative audio segment for the second training triplet by selecting, from the plurality of sound recordings, an audio segment that differs from the anchor audio segment of the second training triplet. Performing the third triplet sampling operation includes: selecting, for a third training triplet of the plurality of training triplets, an anchor audio segment from the plurality of sound recordings; determining a negative audio segment for the third training triplet by selecting, from the plurality of sound recordings, an audio segment that differs from the anchor audio segment of the third training triplet; and determining a positive audio segment for the third training triplet by determining a weighted combination of the anchor audio segment for the third training triplet and the negative audio segment for the third training triplet. Performing the fourth triplet sampling operation includes: selecting, for a fourth training triplet of the plurality of training triplets, an anchor audio segment from the plurality of sound recordings; determining a positive audio segment for the fourth training triplet by selecting, from the plurality of sound recordings, an audio segment that differs from the anchor audio segment of the fourth training triplet, wherein the anchor audio segment for the fourth training triplet and the positive audio segment for the fourth training triplet correspond to respective segments of a first sound recording of the training data; and determining a negative audio segment for the fourth training triplet by selecting, from the plurality of sound recordings, an audio segment that differs from both of the anchor audio segment for the fourth training triplet and the positive audio segment for the fourth training triplet, wherein the negative audio segment for the fourth training triplet corresponds to a segment of a second sound recording of the training data, wherein the second sound recording differs from the first sound recording;

Another aspect of the present disclosure relates to a method including: (i) obtaining training data that includes a plurality of sound recordings; (ii) generating a plurality of training triplets, wherein each training triplet of the plurality of training triplets includes a respective anchor audio segment, a positive audio segment, and a negative audio segment from the plurality of sound recordings, wherein generating the plurality of training triplets includes: (a) performing a first triplet sampling operation to generate a first subset of training triplets of the plurality of training triplets; and (b) performing a second triplet sampling operation to generate a second subset of training triplets of the plurality of training triplets, wherein the second triplet sampling operation is a different triplet sampling operation from the first triplet sampling operation; (iii) mapping each audio segment of each training triplet of the plurality of training triplets to a respective feature vector in an n-dimensional feature space; and (iv) updating the mapping based on the determined feature vectors such that a loss function is reduced. The loss function includes a sum of a plurality of terms. Each term in the plurality of terms corresponds to a respective training triplet in the plurality of training triplets, and a term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet.

Yet another aspect of the present disclosure relates to a method including: (i) obtaining training data that includes a plurality of sound recordings; (ii) generating a plurality of training triplets, wherein each training triplet of the plurality of training triplets includes a respective anchor audio segment, a positive audio segment, and a negative audio segment from the plurality of sound recordings, wherein generating the plurality of training triplets comprises: (a) selecting, for a particular training triplet of the plurality of training triplets, an anchor audio segment from the plurality of sound recordings; (b) determining a negative audio segment for the particular training triplet by selecting, from the sound recordings, an audio segment that differs from the anchor audio segment of the particular training triplet; and (c) determining a positive audio segment for the particular training triplet; (iii) mapping each audio segment of each training triplet of the plurality of training triplets to a respective feature vector in an n-dimensional feature space; and (iv) updating the mapping based on the determined feature vectors such that a loss function is reduced. The loss function includes a sum of a plurality of terms, wherein each term in the plurality of terms corresponds to a respective training triplet in the plurality of training triplets. A term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet. Determining the positive audio segment for the particular training triplet comprises one of: (1) adding noise to the anchor audio segment of the particular training triplet; (2) applying a frequency shift or a time shift to the anchor audio segment for the particular training triplet; (3) determining a weighted combination of the anchor audio segment for the particular training triplet and the negative audio segment for the particular training triplet; or (4) selecting, from the plurality of sound recordings, an audio segment that differs from the anchor audio segment of the particular training triplet and the negative audio segment of the particular training triplet such that the anchor audio segment for the particular training triplet and the positive audio segment for the particular training triplet correspond to respective segments of a first sound recording of the training data, and wherein the negative audio segment for the particular training triplet corresponds to a segment of a second sound recording of the training data that differs from the first sound recording.

Yet another aspect of the present disclosure relates to an article of manufacture including a non-transitory computer-readable medium, having stored thereon program instructions that, upon execution by a computing device, cause the computing device to perform any of the above methods.

Yet another aspect of the present disclosure relates to a system including: (i) a controller; and (ii) a non-transitory computer-readable medium, having stored thereon program instructions that, upon execution by the controller, cause the controller to perform any of the above methods.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

Audio recordings can include a variety of non-speech sounds. These non-speech sounds can include noises related to the operation of machinery, weather, the movements of people or animals, sirens or other alert sounds, barks or other sounds generated by animals, or other sounds. Such sounds may provide information indicative of a location where the audio recording was made (e.g., a train station, an elevator), environmental conditions at the time and location the audio recording was made (e.g., a level of traffic nearby, weather, the presence of machines, vehicles, people, or animals), events occurring at the time and location the audio recording was made (e.g., a car crash, the arrival of a train or other vehicle), or some other information of interest related to the audio recording. It can be beneficial to detect, identify, categorize, or otherwise analyze such sounds in audio recordings, e.g., to predict a time or location at which the audio recording was made, to determine a category for the audio recording from a list of categories, to find other audio recordings that are similar to the audio recording with respect to sound content, location, etc., or to provide some other benefit.

An artificial neural net or other machine learning algorithm could be trained to perform such identification. This could include obtaining manually-generated labels for the audio recordings. The manually-generated labels could then be used to train the machine learning algorithm via a supervised learning process. However, such manual labels can be expensive to generate. Additionally, it can be difficult to determine an enumerated set of labels for such manual labeling that is comprehensive enough to enable all of the sounds present in a full set of varied audio recordings to be adequately labelled.

Alternatively, the methods described herein may be used to generate, in an unsupervised manner, mappings (e.g., artificial neural networks, nonlinear kernels) between segments of audio recordings and feature vectors in a semantically-encoded n-dimensional feature space. Such a mapping may be trained, using the methods described herein, such that feature vectors generated from similar sounds (e.g., emergency sirens, or dog barks) are nearby (e.g., with respect to Euclidean distance) within the n-dimensional feature space. Such a mapping may then be used to identify audio samples that are similar to each other (e.g., via a clustering process) in order to retrieve audio recordings that contain semantically similar contents, in order to bootstrap manually-generated labels from a small set of supervised training examples onto a larger set of audio recordings, or to provide some other benefit.

In order to train such mappings, the methods described herein may be used to generate training examples from an input set of audio recordings. Such training examples can be used to train the mappings in an unsupervised manner. These methods include sampling segments of the audio recordings in order to generate triplets of audio segments that can be used, in combination with a triplet loss function, to train the mappings. These sampling methods generate triplets that include an anchor segment, a positive segment, and a negative segment that have been selected such that the anchor segment should be closer, in the feature space defined by the mapping, to the positive segment than to the negative segment. Thus, the distances between the anchor segment and the positive and negative segments can be input into a loss function (e.g., a hinge loss function) such that the mapping is trained to provide such a feature space.

The sampling methods described herein automatically provide triplets exhibiting such relationships (e.g., triplets wherein the contents of the anchor segment is likely to be more related to the contents of the positive segment than to the contents of the negative segment). The sampling methods provide, in a first example, a positive segment by adding noise (e.g., Gaussian noise) to an anchor segment. In a second example, a positive segment is provided by randomly selecting an additional audio segment from the same audio recording as an anchor segment, while the negative segment is selected from an audio recording other than the audio recording form which the positive and anchor were sampled. In a third example, a positive segment is sampled by generating a weighted combination of randomly-selected anchor and negative segments, with the weighting in favor of the anchor segment by a specified amount. In a fourth example, a positive segment is generated by applying a time and/or frequency shift to an anchor segment. A set of triplets used for training a mapping could include triplets generated using one of these or other sampling methods described herein, or may include triplets generated using a combination of the sampling methods described herein (e.g., first, second, third, and fourth sub-sets of training triplets generated according to the first, second, third, and fourth training methods, respectively).

It should be understood that the above embodiments, and other embodiments described herein, are provided for explanatory purposes, and are not intended to be limiting.

II. MAPPING AUDIO RECORDINGS INTO SEMANTICALLY-ENCODED FEATURE SPACE

It can be beneficial for a variety of applications to obtain a mapping (e.g., an artificial neural network, a nonlinear kernel, a machine learning algorithm or structure, or some other linear or nonlinear mapping) between segments of audio in an n-dimensional feature space, where proximity within the feature space represents semantic similarity between the contents of the audio segment. Such a mapping could be used to determine a degree of semantic similarity between audio segments (e.g., that the audio segments are likely to contain similar sounds, have been recorded from similar locales, or are likely semantically similar in some other respect), to identify audio recordings and/or segments thereof that are semantically similar to a target audio recording (or segment thereof), to identify clusters of audio recordings/audio segments or the determine some other semantic structure within a set of audio recordings, to allow a set of manually-labeled audio segments to be used to train, in a supervised manner, an improved-quality classifier or other machine learning algorithm to identify labels for audio recordings/segments by leveraging the beneficial semantic structure within the n-dimensional feature space defined by the mapping, or to provide some other benefit.

Figure 1A:
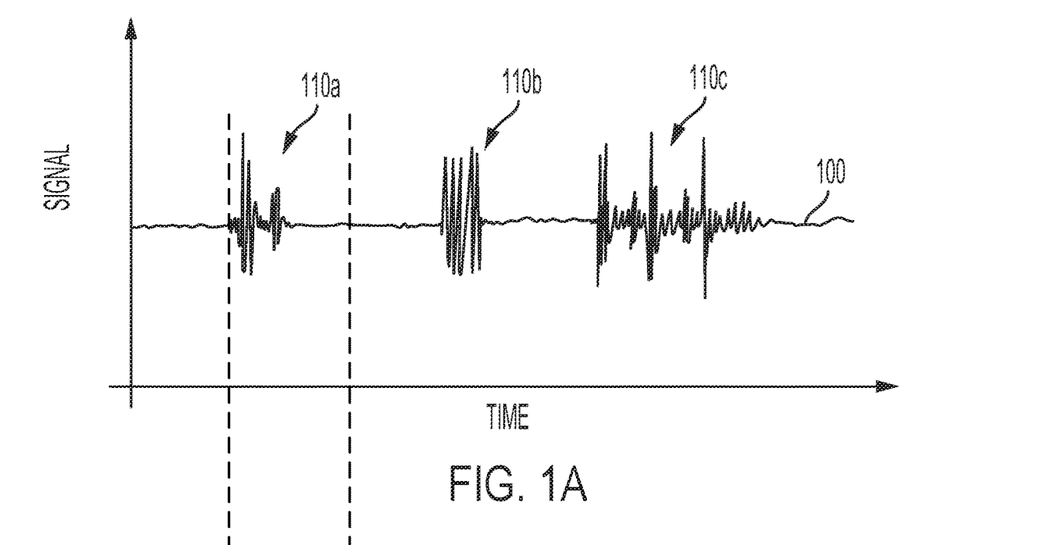
FIG. 1A depicts an example environment containing an example sound recording.

FIG. 1A illustrates an example audio recording 100 that contains a number of sounds 110a, 110b, 110c. The sounds could represent identifiable sounds, e.g., the bark of a dog, a repeated siren emitted by a fire truck, the buzz of a garage warning buzzer, or some other sounds. It could be beneficial to obtain a mapping or other algorithm to map segments of the audio recording e.g., segments of the audio recording that respectively contain the sounds 110a, 110b, 110c) to respective feature vectors in a semantically-encoded n-dimensional feature space. These feature vectors could allow the identity or other information about the sounds 110a, 110b, 110c and/or about the audio recording 100 (e.g., a location and/or time that the audio recording 100 was generated, an event occurring near the time and location that the audio recording 100 was generated, a level of similarity between the sound(s) 110a, 110b, 110c and other sounds contained in a set of audio recordings) to be determined.

The audio recording 100 could include speech. In such examples, the speech sounds could be identified (e.g., via automated or manual methods) and removed from the audio recording 100 prior to using the audio recording 100, as described elsewhere herein, to train a mapping. Alternatively, such speech sounds could be included in the audio recordings used to train, generate, or otherwise obtain the mapping, in which case the mapping may define an n-dimensional semantic space that encodes information about speech sounds (e.g., phonemes, words, etc.) in addition to non-speech sounds.

In order to use a mapping to generate such feature vectors for an audio recording, the audio recording can be partitioned into a plurality of segments over time. A feature vector can then be determined for each of the segments of the audio recording. This can include performing some filtering or other preprocessing, and then applying the filtered or otherwise preprocesses audio segments to the mapping in order to generate respective feature vectors, in the n-dimensional feature space therefor. For example, a spectrogram could be generated for each segment of the audio recording. This is illustrated by way of example by FIG. 1B, which illustrates a plurality of spectrograms 150 generated from respective segments of the audio recording 100. For example, a particular spectrogram 155 has been generated from a segment of the audio recording 100 that contains the first sound 110a. Each spectrogram includes, for each of a plurality of time points within its respective time segment, a plurality of frequency components corresponding to the intensity and/or energy of corresponding frequencies within the audio recording 100 at a respective point in time.

Figure 1B:
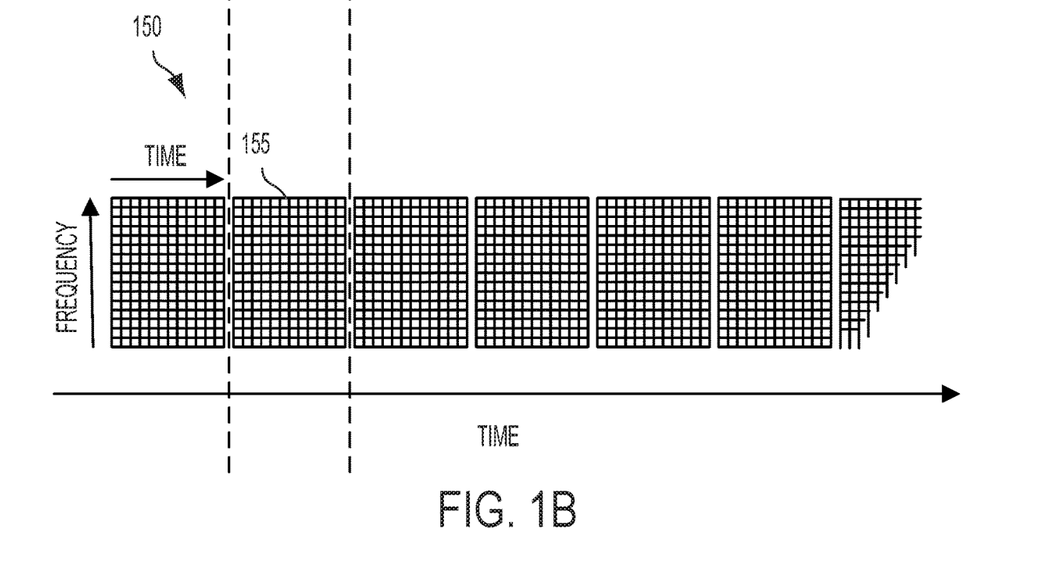
FIG. 1B depicts example spectrograms determined from respective segments of the example sound recording of FIG. 1A.

The spectrogram or other information related to each time segment (e.g., a filtered version of the audio recording 100 during the time segment, the raw audio signal of the audio recording 100 during the time segment, a version of the audio signal after having been applied to a nonlinear kernel) is then applied to a mapping in order to generate respective feature vectors within the semantically-encoded n-dimensional feature space defined by the mapping. Accordingly, the mapping may include artificial neural networks, nonlinear kernels, filters, filter banks, convolutional filters, classifiers, or other structures to facilitate generating, for a spectrogram or other representation of a segment of audio signal, a feature vector in an n-dimensional feature space. In examples wherein the segment of the audio signal is represented by a spectrogram (or other structure represented by values indexed by two or more indices), the mapping could include a convolutional filter or some other structure(s) from the field of image processing. For example, the mapping could include a convolutional neural network that includes one or more convolutional filters that are applied to the spectrogram and the results of that convolution could be applied to one or more layers of units of the convolutional neural network. The mapping could include a neural network having a number of linear (or otherwise configured) output units that corresponds to the number of dimensions n of the n-dimensional feature space.

Figure 2:
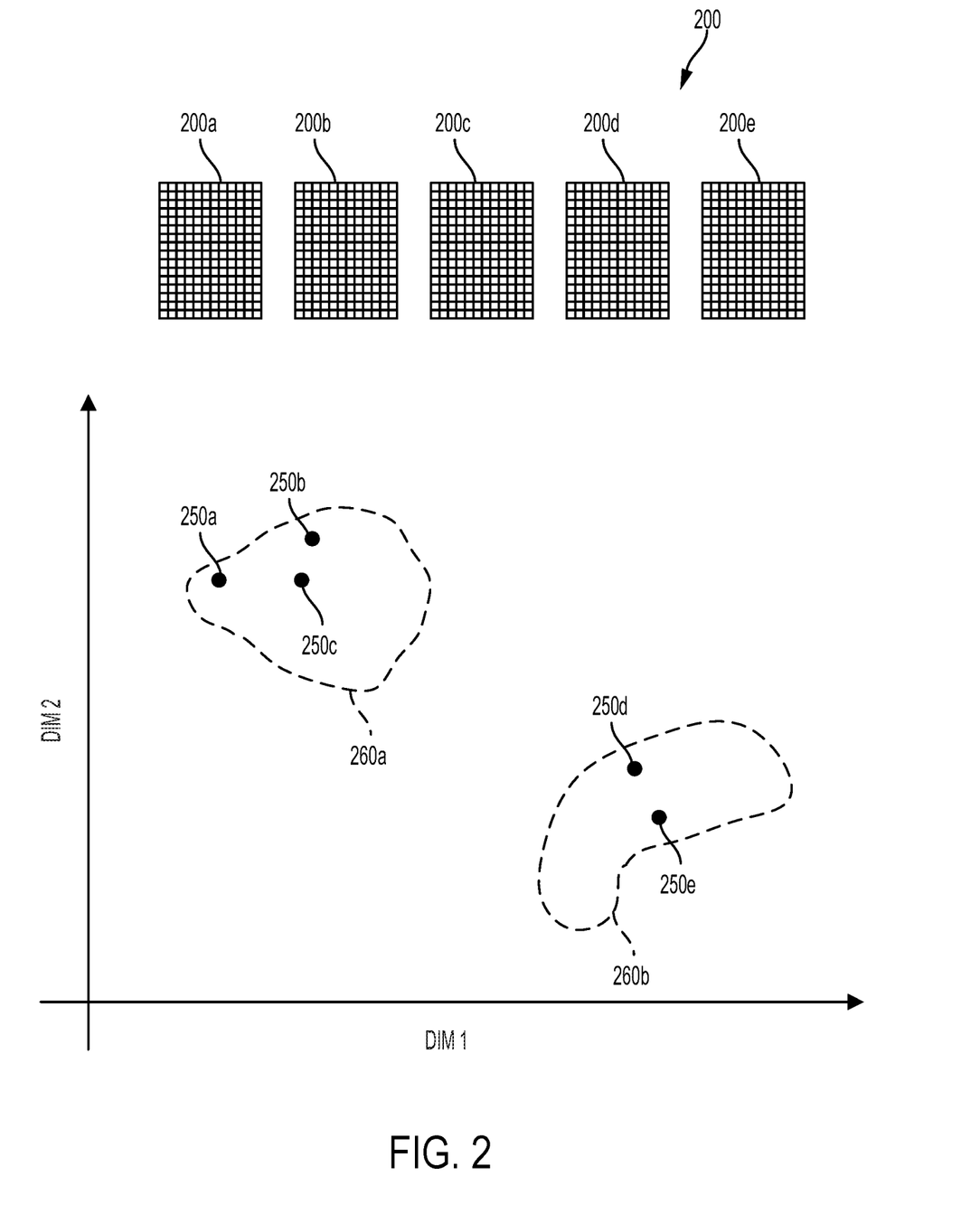
FIG. 2 depicts an example mapping of spectrograms into an n-dimensional feature space.

The mapping can be trained, as described elsewhere herein, such that it maps time segments of audio (e.g., spectrograms generated from time segments) that have similar contents (e.g., that all contain animal noises, that all contain a dog bark, that all contain the sound of wind, that all contain emergency vehicle sirens) to feature vectors that are nearby (e.g., in the sense of Euclidean distance) within a semantically-encoded n-dimensional feature space. FIG. 2 shows a number of spectrograms generated from respective segments of audio recordings (e.g., form the same audio recording or from different audio recordings). FIG. 2 also shows two dimensions ("DIM1" and "DIM2") of an n-dimensional feature space.

A mapping as described herein has been used to generate, for each of the spectrograms 200a, 200b, 200c, 200d, 200e, a respective feature vector 250a, 250b, 250c, 250d, 250e in the n-dimensional feature space. The first three spectrograms 200a, 200b, 200c correspond to respective time segments of audio that include a first kind of semantically-related content (e.g., different kinds of bird call, or dog barks) while the latter two spectrograms 200d, 200e correspond to respective time segments of audio that include a second kind of semantically-related content (e.g., emergency vehicle sirens) that is semantically unrelated to the content of the first three spectrograms 200a, 200b, 200c.

Thus, the level of semantic similarity or dissimilarity between the contents of segments of audio can be determined by determining the distance, within the semantically encoded n-dimensional feature space defined by such a mapping, between feature vectors determined by applying the mapping to spectrograms determined from the segments of audio. This can allow audio segments (and/or audio recordings containing such segments) that contain semantically related contents and/or that are otherwise semantically to a target audio segment (and/or audio recording containing one or more audio segments) to be identified (e.g., to facilitate a query-by-example application).

In another example, a clustering algorithm (e.g., k-means) could be used to identify clusters of related audio segments or other semantic structure within the set of available audio segments. For example, first 260a and second 260b clusters of the feature vectors 250a, 250b, 250c, 250d, 250e could be identified within the n-dimensional feature space illustrated in FIG. 2. Such identification could include determining locations of the clusters within the n-dimensional space, specifying regions (e.g., the illustrated dashed-line regions) within the n-dimensional space, specifying partitions (e.g., hyperplanes) within the n-dimensional space, or determining some other information about the location and/or extent of such clusters within the n-dimensional space. These identified clusters could then be used to identify sets of audio segments that contain semantically related contents and/or that are otherwise semantically to a target audio segment.

In yet another application, a mapping as described herein could be used to improve performance in a supervised classification task. For example, a first set of training data could include a plurality of audio segments and/or audio recordings having associated manually- or otherwise-generated classification values representative of the contents of the audio segments/recordings. A mapping as described herein could be generated based on a second set of training data that includes a further plurality of audio segments and/or recordings (e.g., a set of audio segments that may or may not include the audio segments from the first set of training data). The generated mapping could then be applied to the audio segments of the first training set to generate corresponding feature vectors in the semantically-encoded vector space defined by the mapping. A classifier e.g., an artificial neural network, a support vector machine) could then be trained to predict the classification values based on the corresponding feature vectors.

Such a classifier could be improved relative to a classifier trained on the first set of training data directly (i.e., without using the mapping to map the first set of training data into the n-dimensional feature space) as the mapping may provide useful semantic structure to the resulting feature vectors that can permit the classifier to be more accurate, more parsimonious, and/or more generalizable than in the absence of such semantic structure. Such a classifier, and the related mapping, could then be used to determine classification values (e.g., "dog bark," "vehicle sounds," "emergency vehicle siren") for additional audio segments by mapping the additional audio segment(s) to feature vector(s) in the n-dimensional feature space and then applying the feature vector(s) to the trained classifier to output the classification value(s).

III. SAMPLING TRIPLETS FOR TRAINING ON A TRIPLET LOSS FUNCTION

A mapping that maps an input spectrogram (or other information about an audio segment) to a feature vector in an n-dimensional feature space as described herein (e.g., a mapping that defines a feature space that is semantically encoded such that audio segments containing semantically similar contents are near each other within the feature space) can be generated in a variety of ways. This training can include obtaining a plurality of training examples that each represent examples of semantically similar and/or dissimilar audio segments. The mapping could be applied to the training examples and the output of the mapping then applied to a loss function that provides a loss term that is greater when the mapping performs more poorly. The output of the loss function could then be used to update the mapping (e.g., via backpropagation or some other machine learning training algorithm).

It can be difficult to define the quantitative degree to which pairs of audio segments are more or less semantically alike. It may be more straightforward to define whether a particular audio segment (an "anchor" segment) is more like a first audio segment (a "positive" segment) than a second audio segment (a "negative" segment). Thus, a set of training examples used to train a mapping as described herein may include a plurality of "triplets" of audio segments, where each triplet includes an anchor segment that is more like a positive segment of the triplet than like a negative segment of the triplet. A mapping can then be trained using such triplets such that the mapping defines an n-dimensional feature space such that feature vectors determined for the anchor segments of the training triplets are closer, within the n-dimensional feature space, to feature vectors determined for corresponding positive segments than to feature vectors determined for corresponding negative segments.

Figure 3A:
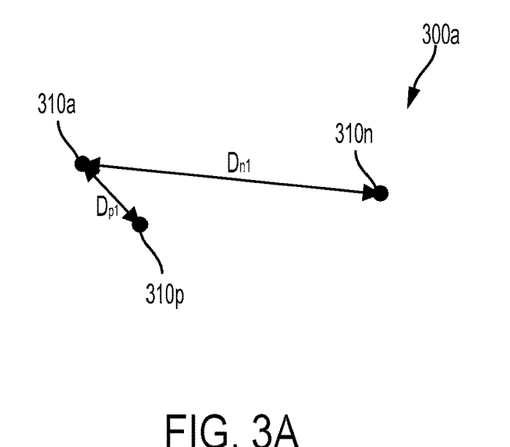
FIG. 3A depicts an example mapping of spectrograms from a sampled triplet into an n-dimensional feature space.

FIG. 3A illustrates the relative locations, within an n-dimensional feature space, of the feature vector of an anchor segment 310a of an example training triplet 300a, the feature vector of a positive segment 310p of the example training triplet 300a, and the feature vector of a negative segment 310n of the example training triplet 300a. The distance (e.g., the Euclidean distance), within the feature space, between the anchor 310a and positive 310p feature vectors is indicated by distance "$D_{p1}$" and the distance between the anchor 310a and negative 310n feature vectors is indicated by distance "$D_{n1}$." The mapping used to generate the illustrated feature vectors 310a, 310p, 310n defines a semantically-encoded n-dimensional feature space wherein the feature vector of the anchor segment 310a is, correctly, closer within the n-dimensional feature space to the feature vector of the positive segment 310p than to the feature vector of the negative segment 310n (i.e., $D_{p1}$ is less than $D_{n1}$).

The distances or some other information about the relative locations of the feature vectors could be used to update or otherwise train the mapping (e.g., to decrease $D_{n1}$ and/or to decrease $D_{n1}$). Alternatively, where the distance between the anchor segment feature vector and the positive segment feature vector (the "anchor-positive distance") is less than the distance between the anchor segment feature vector and the negative segment feature vector (the "anchor-negative distance") for a particular training triplet (e.g., wherein the anchor-positive distance is less than the anchor-negative distance by more than a threshold amount for the particular training triplet), the mapping could be updated based only on other training triplets.

Figure 3B:
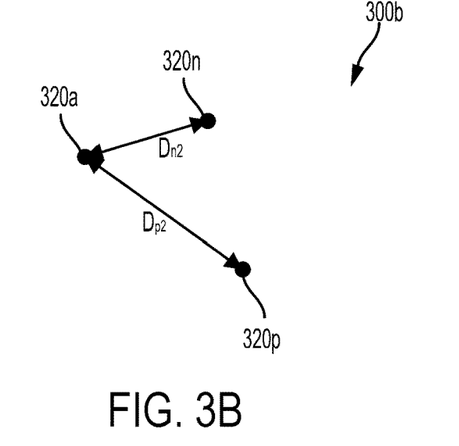
FIG. 3B depicts an example mapping of spectrograms from a sampled triplet into an n-dimensional feature space.

FIG. 3B illustrates the relative locations, within an n-dimensional feature space, of the feature vector of an anchor segment 320a of another example training triplet 300b, the feature vector of a positive segment 320p of the example training triplet 300b, and the feature vector of a negative segment 320n of the example training triplet 300b. The distance (e.g., the Euclidean distance), within the feature space, between the anchor 320a and positive 320p feature vectors is indicated by distance "$D_{p2}$" and the distance between the anchor 320a and negative 320n feature vectors is indicated by distance "$D_{n2}$." The mapping used to generate the illustrated feature vectors 320a, 320p, 320n defines a semantically-encoded n-dimensional feature space wherein the feature vector of the anchor segment 320a is, incorrectly, closer within the n-dimensional feature space to the feature vector of the positive segment 320p than to the feature vector of the negative segment 320n (i.e., $D_{n2}$ is less than $D_{n2}$). Thus, he distances or some other information about the relative locations of the feature vectors could be used to update or otherwise train the mapping (e.g., to decrease $D_{n2}$ and/or to decrease $D_{n2}$) in order to improve the mapping.

A loss function could be provided that receives the relative locations of the feature vectors of segments of such training triplets (e.g., that receives the Euclidean distances between the anchor feature vector and each of the positive and negative feature vectors) and outputs a loss value that could be used to update and/or train the mapping in order to improve the ability of the mapping to project the training segments into an n-dimensional feature space such that the anchor segments are projected to respective feature vectors that are closer to the feature vectors of their respective positive segments than to feature vectors of their respective negative segments. Such a loss function could include a term for each audio segment triplet that is used to train the mapping (e.g., the loss function could include a sum of such terms). Such loss terms could include hinge loss functions, sigmoid or logistic functions, or some other functions according to an application.

Figure 3C:
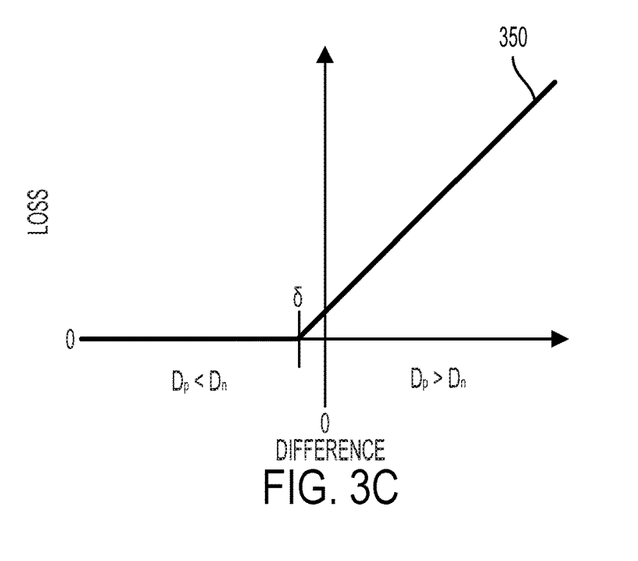
FIG. 3C depicts an example loss function.

In some examples, the loss term for each triplet could be bounded such that the loss term was zero (or some other constant value) when the positive feature vector is closer to the anchor feature vector than the negative feature vector (e.g., when the anchor-positive Euclidean distance is less than the anchor-negative Euclidean distance by at least a threshold amount). In such examples, the mapping could be updated primarily based on those training triplets for which the mapping fails to generate a positive feature vector that is sufficiently closer to the anchor feature vector than the negative feature vector. A term of such a loss function, for a particular training triplet, is shown in FIG. 3C. The loss function 350 of FIG. 3C returns "0" when a difference ("DIFFERENCE") between the anchor-positive feature vector distance ("$D_p$") is less than the anchor-negative feature vector distance ("$D_n$") by more than a threshold amount "δ" This loss function could be represented as $$L(T)=\Sigma_{i=1}^{N}[\|g(x_a^i)-g(x_p^i)\|_2^2-\|g(x_a^i)-g(x_n^i)\|_2^2+\delta]_+$$

where L is the loss function, g is the mapping to be trained, T is a set of N training triplets, each training triplet (denoted by index i) includes an anchor spectrogram $x_a$, a positive spectrogram $x_p$, and a negative spectrogram $x_n$, $\|\cdot\|_2$ is the $L_2$ norm or Euclidean distance, $[\cdot]_+$ is the standard hinge loss function, and δ is a threshold parameter.

Triplets of audio segments and/or spectrograms determined therefrom can be generated via a variety of methods. Such triplets could be generated manually (e.g., by presenting a variety of triplet of audio to a person and receiving, from the person, and indication of which triplets are more alike). However, such manual annotation can be expensive. Instead, triplets of audio segments (i.e., sets of anchor, positive, and negative audio segments) for training a mapping as described herein can be generated automatically, from a training set of audio recordings, via a number of different sampling methods. Each sampling method can be based on a respective heuristic related to the likely semantic structure and/or relatedness of segments of audio. A set of training triplets can then be generated using one or more of the provided sampling methods, or a combination of the provided sampling methods and some additional sampling methods. For example, a set of training triplets could be generated by using all of the sampling methods described herein.

For example, the addition of an amount of noise to an audio segment should not, in general, alter the classification and/or semantic content of the audio segment. Accordingly, a training triplet of audio segments could be generated by selecting an anchor audio segment from a training set of audio recordings. The positive audio segment for the triplet could then be generated by adding noise (e.g., Gaussian noise) to the anchor audio segment. The negative audio segment for the triplet could then be generated by selecting another audio segment, that differs from the selected anchor segment, from the training set of audio recordings.

In another example, applying a small shift in time and/or frequency to the spectrogram of an audio segment should not, in general, alter the classification and/or semantic content of the time- and/or frequency-shifted audio segment. Accordingly, a training triplet of spectrograms could be generated by selecting an anchor audio segment from a training set of audio recordings and generating a spectrogram therefrom. The positive audio segment for the triplet could then be generated by applying a shift in time and/or frequency to the anchor spectrogram. The negative spectrogram for the triplet could then be generated by selecting another audio segment, that differs from the selected anchor segment, from the training set of audio recordings and determining a spectrogram therefrom.

In yet another example, a non-equally weighted combination of two different audio segments should, in general, correspond more closely (with respect to classification value, semantic content, etc.) to the audio segment that is represented to a greater degree in the weighted combination. Accordingly, a training triplet of spectrograms could be generated by selecting an anchor audio segment from a training set of audio recordings. The negative spectrogram for the triplet could then be generated by selecting another audio segment, that differs from the selected anchor segment, from the training set of audio recordings. The positive audio segment for the triplet could then be generated by generating a weighted combination of the anchor and negative segments, with the weighted combination weighted more heavily toward the anchor spectrogram. Such a weighting may be normalized to account for differences in the energy and/or power represented in the anchor and negative spectrograms. For example, the positive audio segment and/or the positive spectrogram could be generated according to $$x_p = x_a [E(x_a)/E(x_n)] \bar{x}_n$$

where $x_p$, $x_n$, and $x_a$ are the anchor, negative, positive spectrograms or audio segments, respectively, $E(\bullet)$ is the total energy of an audio segment/spectrogram, and $\alpha$ is a weighting parameter set to a positive value that is less than one.

In another example, different audio segments samples from the same audio recording should, in general, be more alike with respect to classification and/or semantic content than audio segments sampled from different audio recordings. Accordingly, a training triplet of spectrograms could be generated by selecting an anchor audio segment from a first audio recording of a training set of audio recordings. The positive audio segment for the triplet could then be generated by sampling another audio segment from the first audio recording. The negative spectrogram for the triplet could then be generated by sampling an audio segment from a second audio recording that differs from the first audio recording. In order to increase the likelihood that the anchor and positive audio segments represent similar classifications and/or semantic contents, the sampling of the positive audio segment could be restricted to audio segments of the first audio recording that are within a maximum time difference from the anchor audio segment.

IV. EXAMPLE SYSTEMS

Computational functions (e.g., functions to map a spectrogram or other representation of a segment of an audio recording to a feature vector within a semantically-encoded feature space, functions to train such a mapping based on a plurality of triplets of audio segments and/or spectrograms determined therefrom, functions for sampling such training triplets from a training set of audio recordings) described herein may be performed by one or more computing systems. Such a computing system may be integrated into or take the form of a computing device, such as a mobile phone, tablet computer, laptop computer, server, home automation element, standalone video capture and processing device, cloud computing network, and/or programmable logic controller. For purposes of example, FIG. 4 is a simplified block diagram showing some of the components of an example computing device 400.

By way of example and without limitation, computing device 400 may be a cellular mobile telephone (e.g., a smartphone), a video camera, a computer (such as a desktop, notebook, tablet, or handheld computer), a personal digital assistant (PDA), a wearable computing device, a server, a cloud computing system (e.g., a networked plurality of servers or other computational units), or some other type of device or combination of devices. It should be understood that computing device 400 may represent a physical device, a particular physical hardware platform on which applications operate in software, or other combinations of hardware and software that are configured to carry out mapping, training, and/or audio processing functions.

Figure 4:
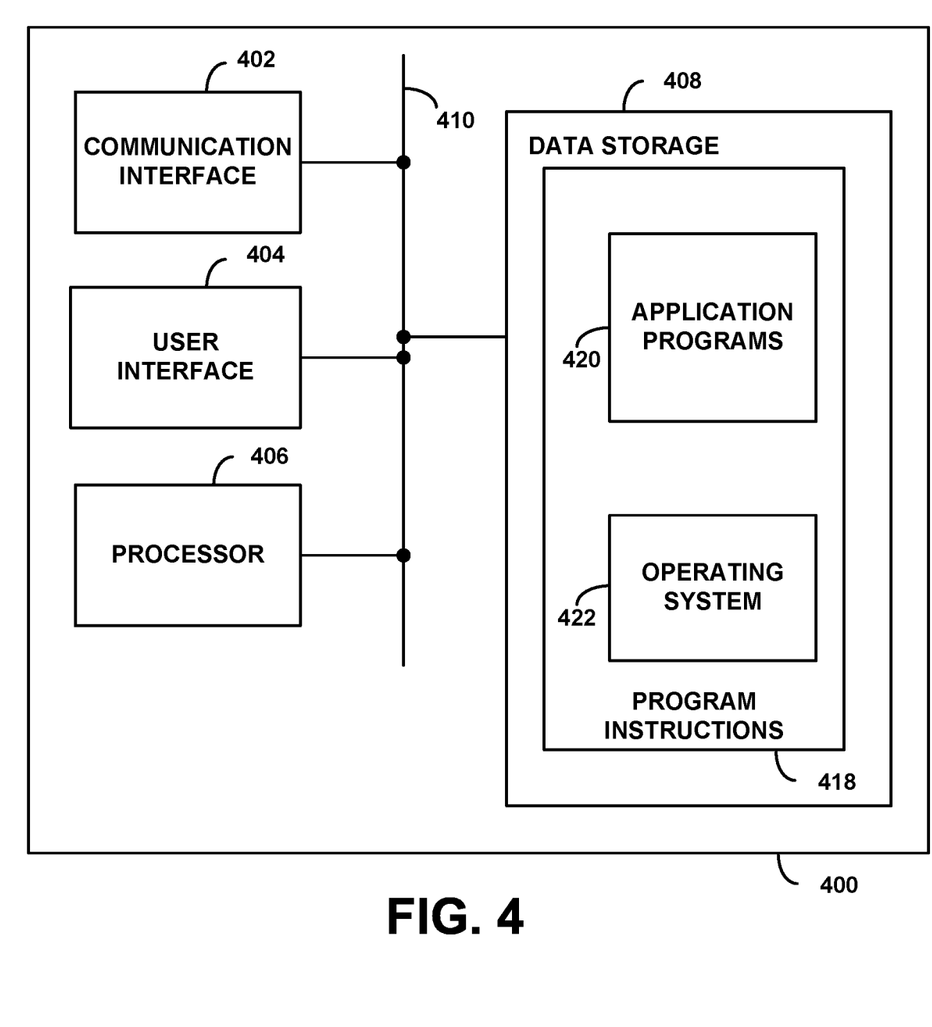
FIG. 4 is a simplified block diagram showing some of the components of an example system.

As shown in FIG. 4, computing device 400 may include a communication interface 402, a user interface 404, a processor 406, and data storage 408, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 402 may function to allow computing device 400 to communicate with other devices, remote servers, access networks, and/or transport networks. For example, the communication interface 402 may function to transmit and/or receive an indication of audio recording, to transmit an indication of a mapping that has been generated using the methods described herein, or some other information. For example, the computing device 400 could be computer, server, cloud computing system, or other system configured to perform the methods described herein and the remote system could be a cellphone, digital camera, or other audio capturing device configured to transmit an audio recording and to receive, from the computing device 400, a classification value for the audio recording and/or for audio segments thereof, an indication of audio recordings and/or segments thereof that are semantically similar to the transmitted audio recording, or to receive some other information from the computing device 400.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LIED technologies, or other technologies now known or later developed. User interface 404 may also be configured to generate audible output(s), via a speaker, speaker jack, audio output port, audio output device, earphones, and/or other similar devices.

In some embodiments, user interface 404 may include a display that serves to present video or other images to a user. Additionally, user interface 404 may include one or more buttons, switches, knobs, and/or dials that facilitate the configuration and operation of the computing device 400. It may be possible that some or all of these buttons, switches, knobs, and/or dials are implemented as functions on a touch- or presence-sensitive panel.

Processor 406 may comprise one or more general purpose processors—e.g., microprocessors and/or one or more special purpose processors—digital signal processors (DSPs), graphics processing units (GPUs), floating point units (FPUs), network processors, or application-specific integrated circuits (ASICs). In some instances, special purpose processors may be capable of audio processing and neural network computation, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., audio recording functions, audio processing, neural network or other classifier or mapping training) installed on computing device 400.

Application programs 420 may take the form of "apps" that could be downloadable to computing device 400 through one or more online application stores or application markets (via, e.g., the communication interface 402). However, application programs can also be installed on computing device 400 in other ways, such as via a web browser or through a physical interface (e.g., a USB port) of the computing device 400.

In some examples, portions of the methods described herein could be performed by different devices, according to an application. For example, different devices of a system could have different amounts of computational resources (e.g., memory, processor cycles) and different information bandwidths for communication between the devices. For example, a first device could be a cellphone or other audiovisual capture device that could transmit an audio recording to another device or server that has the necessary computational resources to perform the methods described herein to the transmitted audio information. Different portions of the methods described herein could be apportioned according to such considerations.

V. EXAMPLE METHODS

Figure 5:
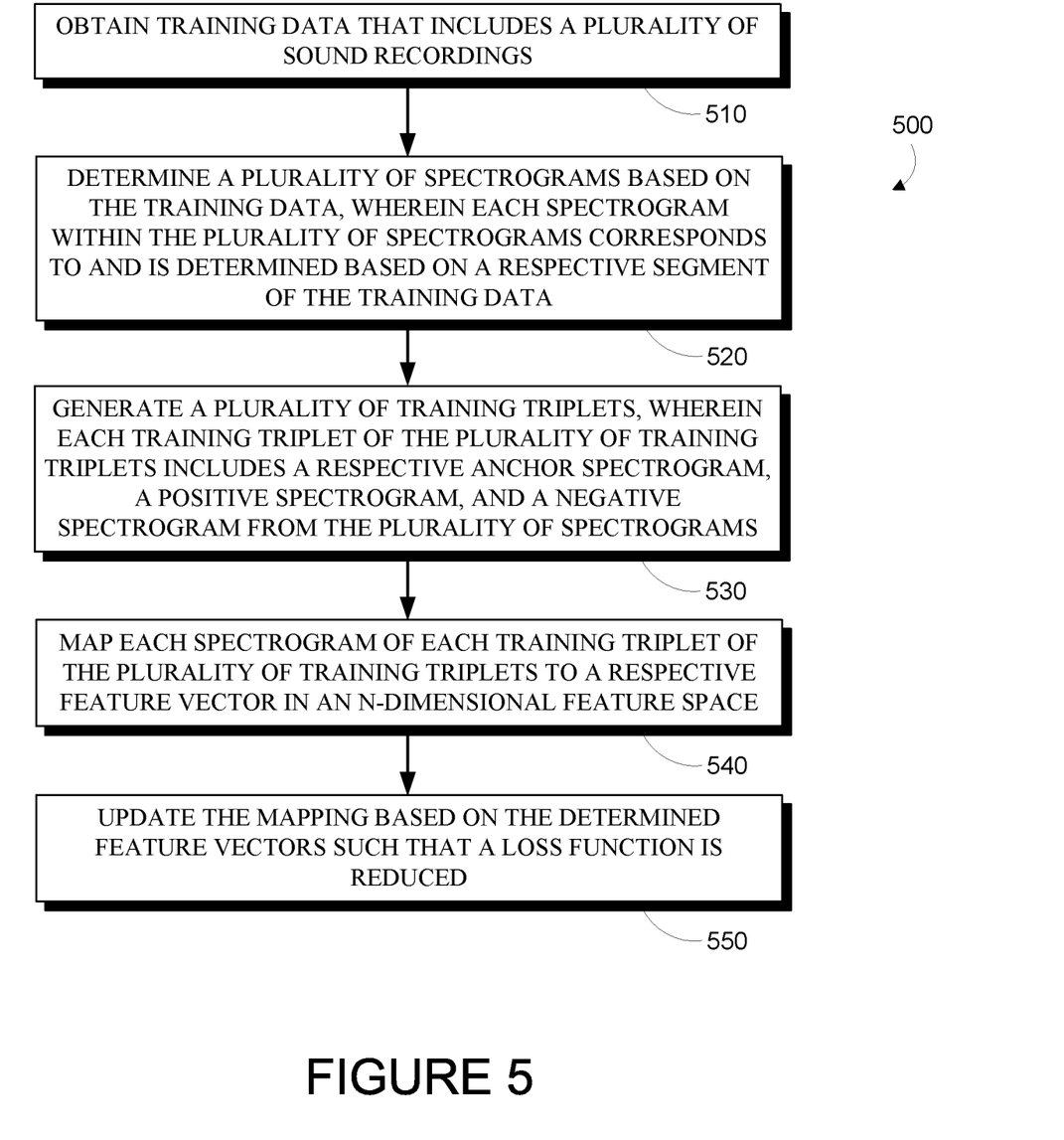
FIG. 5 is a flowchart of a method, according to an example embodiment.

FIG. 5 is a flowchart of a method 500 for generating a mapping (e.g., an artificial neural network, a nonlinear kernel) that can map a spectrogram (or other representation) of a segment of an audio signal to a feature vector within an n-dimensional feature space such that audio segments that include semantically similar contents (e.g., animal noises, dog barks, emergency vehicle sirens, etc.) are mapped to feature vectors that are near each other within the feature space. The method 500 includes obtaining training data that includes a plurality of sound recordings (510). This can include operating one or more microphones to record the audio signals from one or more environments. Additionally or alternatively, this can include accessing one or more databases that contain the audio recordings. The method 500 additionally includes determining a plurality of spectrograms based on the training data, wherein each spectrogram within the plurality of spectrograms corresponds to and is determined based on a respective segment of the training data (520).

The method 500 additionally includes generating a plurality of training triplets, wherein each training triplet of the plurality of training triplets includes a respective anchor spectrogram, a positive spectrogram, and a negative spectrogram from the plurality of spectrograms (530). This can include performing one or more (e.g., first and second sampling operations) of the following sampling operations: (i) selecting an anchor spectrogram from the plurality of spectrograms, determining a positive spectrogram by adding noise to the anchor spectrogram, and determining a negative spectrogram by selecting, from the plurality of spectrograms, a spectrogram that differs from the anchor spectrogram; (ii) selecting an anchor spectrogram from the plurality of spectrograms, determining a positive spectrogram by applying a frequency shift or a time shift to the anchor spectrogram, and determining a negative spectrogram by selecting, from the plurality of spectrograms, a spectrogram that differs from the anchor spectrogram; (iii) selecting an anchor spectrogram from the plurality of spectrograms, determining a negative spectrogram by selecting, from the plurality of spectrograms, a spectrogram that differs from the anchor spectrogram, and determining a positive spectrogram by determining a weighted combination of the anchor spectrogram and the negative spectrogram; or (iv) selecting an anchor spectrogram from the plurality of spectrograms, determining a positive spectrogram by selecting, from the plurality of spectrograms, a spectrogram that differs from the anchor spectrogram such that the anchor spectrogram and the positive spectrogram correspond to respective segments of a first sound recording of the training data, and determining a negative spectrogram by selecting, from the plurality of spectrograms, a spectrogram that differs from both of the anchor spectrogram and the positive spectrogram and that corresponds to a segment of a second sound recording of the training data, wherein the second sound recording differs from the first sound recording.

The method 500 additionally includes mapping each spectrogram of each training triplet of the plurality of training triplets to a respective feature vector in an n-dimensional feature space (540). The method 500 further includes updating the mapping based on the determined feature vectors such that a loss function is reduced (550). The loss function includes a sum of a plurality of terms, where each term in the plurality of terms corresponds to a respective training triplet in the plurality of training triplets. A term of the loss function that corresponds to a particular training triplet is increased by increasing an anchor-positive distance relative to an anchor-negative when the anchor-positive distance is not less than the anchor-negative distance by at least a specified threshold amount. The distances may be Euclidean distances or some other distance metric of interest (e.g., $L_1$ distance, $L_0$ distance) Each term of the loss function could be a hinge loss function or some other loss function of interest (e.g., a differentiable loss function). Updating the mapping based on the loss function could include using backpropagation or some other method for updating the mapping based on the loss function and/or individual terms thereof.

The method 500 could include additional elements or features. For example, the method 500 could include using the mapping to identify clusters of feature vectors within the feature space and/or to identify audio segment(s) within a set of audio recordings that are similar to a target audio segment by identifying audio segment(s) within the set of audio recordings that have mapping-generated feature vectors that are proximate to a mapping-generated feature vector of the target audio segment (e.g., identifying the feature vector that is closest to the feature vector of the target audio segment). The method 500 could include using the mapping to generate an improved classifier based on a set of classification-labeled audio segments, e.g., by training a classifier to predict the classifications corresponding to the audio segments based on feature vectors generated for the audio segments using the mapping.

VI. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
    obtaining training data, wherein the training data comprises a plurality of sound recordings;
    generating a plurality of training triplets, wherein each training triplet of the plurality of training triplets includes a respective anchor audio segment, a positive audio segment, and a negative audio segment from the plurality of sound recordings, wherein generating the plurality of training triplets comprises: (i) performing a first triplet sampling operation to generate a first subset of training triplets of the plurality of training triplets; and (ii) performing a second triplet sampling operation to generate a second subset of training triplets of the plurality of training triplets, wherein the second triplet sampling operation is a different triplet sampling operation from the first triplet sampling operation;
    applying a mapping to determine, for each audio segment of each training triplet of the plurality of training triplets, a respective feature vector in an n-dimensional feature space; and
    updating the mapping based on the determined feature vectors such that a loss function is reduced, wherein the loss function comprises a sum of a plurality of terms, wherein each term in the plurality of terms corresponds to a respective training triplet in the plurality of training triplets, and wherein a term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet; and
    applying the updated mapping to at least one of: (i) determine an additional feature vector in the n-dimensional feature space for an additional segment of sound data, (ii) determine at least two cluster locations within the n-dimensional feature space that correspond to respective clusters of sound recordings within the training data, or (iii) train a classifier to classify an additional segment of sound data based on an additional feature vector that is generated by applying the updated mapping to the additional segment of sound data.

2. The method of claim 1, wherein applying the mapping to determine, for a given audio segment, a corresponding feature vector in the n-dimensional feature space comprises:
    determining a spectrogram based on the given audio segment; and
    applying the mapping to the determined spectrogram to determine the corresponding feature vector in the n-dimensional feature space.

3. The method of claim 1, wherein performing the first triplet sampling operation comprises:
    selecting, for a particular training triplet of the first subset of training triplets, an anchor audio segment from the plurality of sound recordings;
    determining a positive audio segment for the particular training triplet by adding noise to the anchor audio segment of the particular training triplet; and determining a negative audio segment for the particular training triplet by selecting, from the plurality of sound recordings, an audio segment that differs from the anchor audio segment of the particular training triplet.

4. The method of claim 1, wherein performing the first triplet sampling operation comprises:
    selecting, for a particular training triplet of the first subset of training triplets, an anchor audio segment from the plurality of sound recordings;
    determining a positive audio segment for the first training triplet by applying at least one of a frequency shift or a time shift to the anchor audio segment for the first training triplet; and
    determining a negative audio segment for the particular training triplet by selecting, from the plurality of sound recordings, an audio segment that differs from the anchor audio segment of the particular training triplet.

5. The method of claim 1, wherein performing the first triplet sampling operation comprises:
    selecting, for a particular training triplet of the first subset of training triplets, an anchor audio segment from the plurality of sound recordings;
    determining a negative audio segment for the particular training triplet by selecting, from the plurality of sound recordings, an audio segment that differs from the anchor audio segment of the particular training triplet; and
    determining a positive audio segment for the particular training triplet by determining a weighted combination of the anchor audio segment for the particular training triplet and the negative audio segment for the particular training triplet.

6. The method of claim 1, wherein performing the first triplet sampling operation comprises:
    selecting, for a particular training triplet of the first subset of training triplets, an anchor audio segment from the plurality of sound recordings;
    determining a positive audio segment for the particular training triplet by selecting, from the plurality of sound recordings, an audio segment that differs from the anchor audio segment of the particular training triplet, wherein the anchor audio segment for the particular training triplet and the positive audio segment for the particular training triplet correspond to respective segments of a first sound recording of the training data; and
    determining a negative audio segment for the particular training triplet by selecting, from the plurality of sound recordings, an audio segment that differs from both of the anchor audio segment for the particular training triplet and the positive audio segment for the particular training triplet, wherein the negative audio segment for the particular training triplet corresponds to a segment of a second sound recording of the training data, wherein the second sound recording differs from the first sound recording.

7. The method of claim 1, wherein the first distance is a Euclidean distance within the n-dimensional feature space between the feature vector of the anchor audio segment of the particular training triplet and the feature vector of the positive audio segment of the particular training triplet, wherein the second distance is a Euclidean distance within the n-dimensional feature space between the feature vector of the anchor audio segment of the particular training triplet and the feature vector of the negative audio segment of the particular training triplet, and wherein the term of the loss function that corresponds to the particular training triplet comprises a hinge loss function applied to a difference between the square of the first distance and the square of the second distance.

8. The method of claim 1, further comprising:
applying the updated mapping to determine, for each anchor audio segment of each training triplet of the plurality of training triplets, a respective updated feature vector in the n-dimensional feature space;
obtaining an additional segment of sound data;
applying the updated mapping to the additional segment of sound data to determine an additional feature vector in the n-dimensional feature space for the additional segment of sound data;
selecting one of the updated feature vectors based on proximity, within the n-dimensional feature space, to the additional feature vector; and
retrieving a segment of the training data that corresponds, via a respective one of the anchor audio segments, to the selected updated feature.

9. The method of claim 1, further comprising:
applying the updated mapping to determine, for each anchor audio segment of each training triplet of the plurality of training triplets, a respective updated feature vector in the n-dimensional feature space; and
determining, based on the updated feature vectors, at least two cluster locations within the n-dimensional feature space that correspond to respective clusters of updated feature vectors.

10. The method of claim 9, further comprising:
obtaining an additional segment of sound data;
obtaining, for the additional segment of sound data, a classification value;
applying the updated mapping to the additional segment of sound data to determine an additional feature vector in the n-dimensional feature space for the additional segment of sound data;
selecting, for the additional segment of sound data based on proximity within the n-dimensional feature space between the additional feature vector and the cluster locations of the at least two cluster locations, a cluster location from the at least two cluster locations;
selecting, based on proximity within the n-dimensional feature space to the selected cluster location, a plurality of the updated feature vectors; and
applying the classification value to a plurality of segments of the training data that respectively correspond to the selected updated feature vectors.

11. The method of claim 1, further comprising:
obtaining a plurality of additional segments of sound data;
obtaining a plurality of classification values, wherein each of the obtained classification values corresponds to a respective one of the obtained additional segments of sound data;
applying the updated mapping algorithm to each of the additional segments of sound data to determine a respective additional feature vector in the n-dimensional feature space; and
training a classifier based on the additional feature vectors and the obtained plurality of classification values.

12. The method of claim 11, further comprising:
obtaining a further segment of sound data;
applying the updated mapping to the further segment of sound data to determine further feature vector in the n-dimensional feature space for the further segment of sound data; and
applying the trained classifier to the further feature vector to generate, for the further segment of sound data, a classification value.

13. A method comprising:
obtaining training data, wherein the training data comprises a plurality of sound recordings;
generating a plurality of training triplets, wherein each training triplet of the plurality of training triplets includes a respective anchor audio segment, a positive audio segment, and a negative audio segment from the plurality of sound recordings, wherein generating the plurality of training triplets comprises performing one of:
(i) a first triplet sampling operation, wherein performing the first triplet sampling operation comprises:
selecting, for a first training triplet of the plurality of training triplets, an anchor audio segment from the plurality of sound recordings;
determining a positive audio segment for the first training triplet by adding noise to the anchor audio segment of the first training triplet; and
determining a negative audio segment for the first training triplet by selecting, from the plurality of sound recordings, an audio segment that differs from the anchor audio segment of the first training triplet;
(ii) a second triplet sampling operation, wherein performing the second triplet sampling operation comprises:
selecting, for a second training triplet of the plurality of training triplets, an anchor audio segment from the plurality of sound recordings;
determining a positive audio segment for the second training triplet by applying a frequency shift or a time shift to the anchor audio segment for the second training triplet; and
determining a negative audio segment for the second training triplet by selecting, from the plurality of sound recordings, an audio segment that differs from the anchor audio segment of the second training triplet;
(iii) a third triplet sampling operation, wherein performing the third triplet sampling operation comprises:
selecting, for a third training triplet of the plurality of training triplets, an anchor audio segment from the plurality of sound recordings;
determining a negative audio segment for the third training triplet by selecting, from the plurality of sound recordings, an audio segment that differs from the anchor audio segment of the third training triplet; and
determining a positive audio segment for the third training triplet by determining a weighted combination of the anchor audio segment for the third training triplet and the negative audio segment for the third training triplet; or
(iv) a fourth triplet sampling operation, wherein performing the fourth triplet sampling operation comprises:
selecting, for a fourth training triplet of the plurality of training triplets, an anchor audio segment from the plurality of sound recordings;
determining a positive audio segment for the fourth training triplet by selecting, from the plurality of sound recordings, an audio segment that differs from the anchor audio segment of the fourth training triplet, wherein the anchor audio segment for the fourth training triplet and the positive audio segment for the fourth training triplet correspond to respective segments of a first sound recording of the training data; and determining a negative audio segment for the fourth training triplet by selecting, from the plurality of sound recordings, an audio segment that differs from both of the anchor audio segment for the fourth training triplet and the positive audio segment for the fourth training triplet, wherein the negative audio segment for the fourth training triplet corresponds to a segment of a second sound recording of the training data, wherein the second sound recording differs from the first sound recording;

applying a mapping to determine, for each audio segment of each training triplet of the plurality of training triplets, a respective feature vector in an n-dimensional feature space;

updating the mapping based on the determined feature vectors such that a loss function is reduced, wherein the loss function comprises a sum of a plurality of terms, wherein each term in the plurality of terms corresponds to a respective training triplet in the plurality of training triplets, and wherein a term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet; and applying the updated mapping to at least one of: (i) determine an additional feature vector in the n-dimensional feature space for an additional segment of sound data, (ii) determine at least two cluster locations within the n-dimensional feature space that correspond to respective clusters of sound recordings within the training data, or (iii) train a classifier to classify an additional segment of sound data based on an additional feature vector that is generated by applying the updated mapping to the additional segment of sound data.

14. The method of claim 13, wherein applying the mapping to determine, for a given audio segment, a corresponding feature vector in the n-dimensional feature space comprises:

determining a spectrogram based on the given audio segment; and applying the mapping to the determined spectrogram to determine the corresponding feature vector in the n-dimensional feature space.

15. The method of claim 13, wherein generating the plurality of training triplets comprises performing the fourth triplet sampling operation and at least one of the first triplet sampling operation, the second triplet sampling operation, or the third triplet sampling operation.

16. The method of claim 13, further comprising:

applying the updated mapping to determine, for each anchor audio segment of each training triplet of the plurality of training triplets, a respective updated feature vector in the n-dimensional feature space;

obtaining an additional segment of sound data;

applying the updated mapping to the additional segment of sound data to determine an additional feature vector in the n-dimensional feature space for the additional segment of sound data;

selecting one of the updated feature vectors based on proximity, within the n-dimensional feature space, to the additional feature vector; and retrieving a segment of the training data that corresponds, via a respective one of the anchor audio segments, to the selected updated feature.

17. The method of claim 13, further comprising:

applying the updated mapping to determine, for each anchor audio segment of each training triplet of the plurality of training triplets, a respective updated feature vector in the n-dimensional feature space;

determining, based on the updated feature vectors, at least two locations within the n-dimensional feature space that correspond to respective clusters of updated feature vectors within the n-dimensional feature space;

obtaining an additional segment of sound data;

obtaining, for the additional segment of sound data, a classification value;

applying the updated mapping to the additional segment of sound data to determine an additional feature vector in the n-dimensional feature space for the additional segment of sound data;

selecting, for the additional segment of sound data based on proximity within the n-dimensional feature space between the additional feature vector and the cluster locations of the at least two cluster locations, a cluster location from the at least two cluster locations;

selecting, based on proximity within the n-dimensional feature space to the selected cluster location, a plurality of the updated feature vectors; and applying the classification value to a plurality of segments of the training data that respectively correspond to the selected updated feature vectors.

18. The method of claim 13, further comprising:

obtaining a plurality of additional segments of sound data;

obtaining a plurality of classification values, wherein each of the obtained classification values corresponds to a respective one of the obtained additional segments of sound data;

applying the updated mapping algorithm to each of the additional segments of sound data to determine a respective additional feature vector in the n-dimensional feature space;

training a classifier based on the additional segments of sound data and the obtained plurality of classification values;

obtaining a further segment of sound data;

applying the updated mapping to the further segment of sound data to determine further feature vector in the n-dimensional feature space for the further segment of sound data; and applying the trained classifier to the further feature vector to generate, for the further segment of sound data, a classification value.

19. A method comprising:

obtaining training data, wherein the training data comprises a plurality of sound recordings;

generating a plurality of training triplets, wherein each training triplet of the plurality of training triplets includes a respective anchor audio segment, a positive audio segment, and a negative audio segment from the plurality of sound recordings, wherein generating the plurality of training triplets comprises:

selecting, for a particular training triplet of the plurality of training triplets, an anchor audio segment from the plurality of sound recordings;

determining a negative audio segment for the particular training triplet by selecting, from the plurality of sound recordings, an audio segment that differs from the anchor audio segment of the particular training triplet; and determining a positive audio segment for the particular training triplet, wherein determining the positive audio segment for the particular training triplet comprises one of: (i) adding noise to the anchor audio segment of the particular training triplet; (ii) applying a frequency shift or a time shift to the anchor audio segment for the particular training triplet; (iii) determining a weighted combination of the anchor audio segment for the particular training triplet and the negative audio segment for the particular training triplet; or (iv) selecting, from the plurality of sound recordings, an audio segment that differs from the anchor audio segment of the particular training triplet and the negative audio segment of the particular training triplet such that the anchor audio segment for the particular training triplet and the positive audio segment for the particular training triplet correspond to respective segments of a first sound recording of the training data, and wherein the negative audio segment for the particular training triplet corresponds to a segment of a second sound recording of the training data that differs from the first sound recording;

applying a mapping to determine, for each audio segment of each training triplet of the plurality of training triplets, a respective feature vector in an n-dimensional feature space;

updating the mapping based on the determined feature vectors such that a loss function is reduced, wherein the loss function comprises a sum of a plurality of terms, wherein each term in the plurality of terms corresponds to a respective training triplet in the plurality of training triplets, and wherein a term of the loss function that corresponds to a particular training triplet is increased by increasing a first distance relative to a second distance when the first distance is not less than the second distance by at least a specified threshold amount, wherein the first distance is between the feature vector of the anchor audio segment of the particular training triplet and the feature vector of the positive audio segment of the particular training triplet, and wherein the second distance is between the feature vector of the anchor audio segment of the particular training triplet and the feature vector of the negative audio segment of the particular training triplet; and applying the updated mapping to at least one of: (i) determine an additional feature vector in the n-dimensional feature space for an additional segment of sound data, (ii) determine at least two cluster locations within the n-dimensional feature space that correspond to respective clusters of sound recordings within the training data, or (iii) train a classifier to classify an additional segment of sound data based on an additional feature vector that is generated by applying the updated mapping to the additional segment of sound data.

20. The method of claim 19, wherein applying the mapping to determine, for a given audio segment, a corresponding feature vector in the n-dimensional feature space comprises:

determining a spectrogram based on the given audio segment; and applying the mapping to the determined spectrogram to determine the corresponding feature vector in the n-dimensional feature space.

* * * * *